Oct. 28, 1969 C. J. STALEGO 3,475,147
METHOD AND APPARATUS FOR PROCESSING HEAT-SOFTENED MATERIAL
Filed June 16, 1966 3 Sheets-Sheet 2
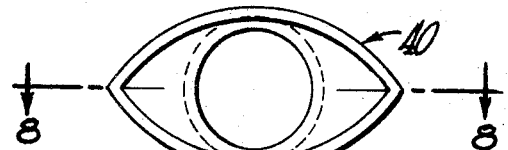
Fig. 7
Fig. 8
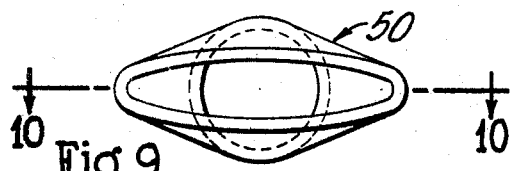
Fig. 9
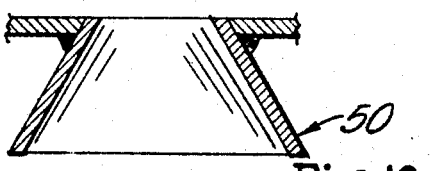
Fig. 10
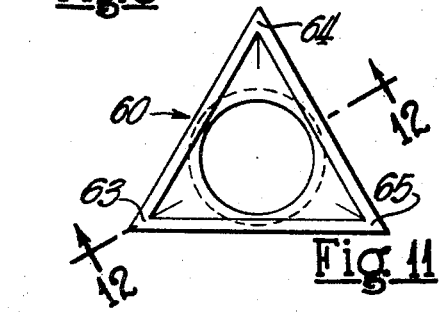
Fig. 11
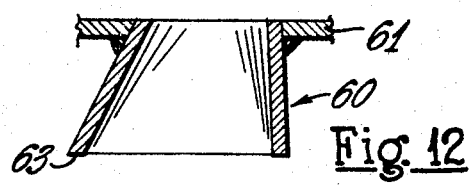
Fig. 12
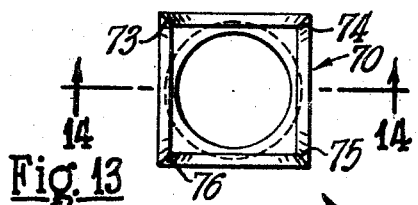
Fig. 13 Fig. 14
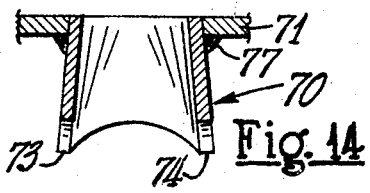
Fig. 15 Fig. 16
Fig. 18
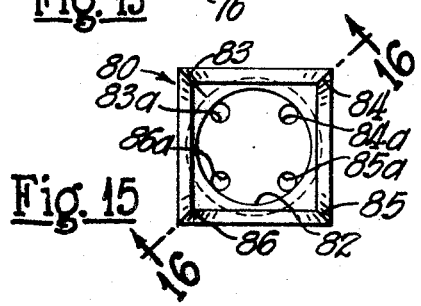
Fig. 17
INVENTOR.
CHARLES J. STALEGO
BY
Staelin & Overman
ATTORNEYS Oct. 28, 1969  C. J. STALEGO  3,475,147

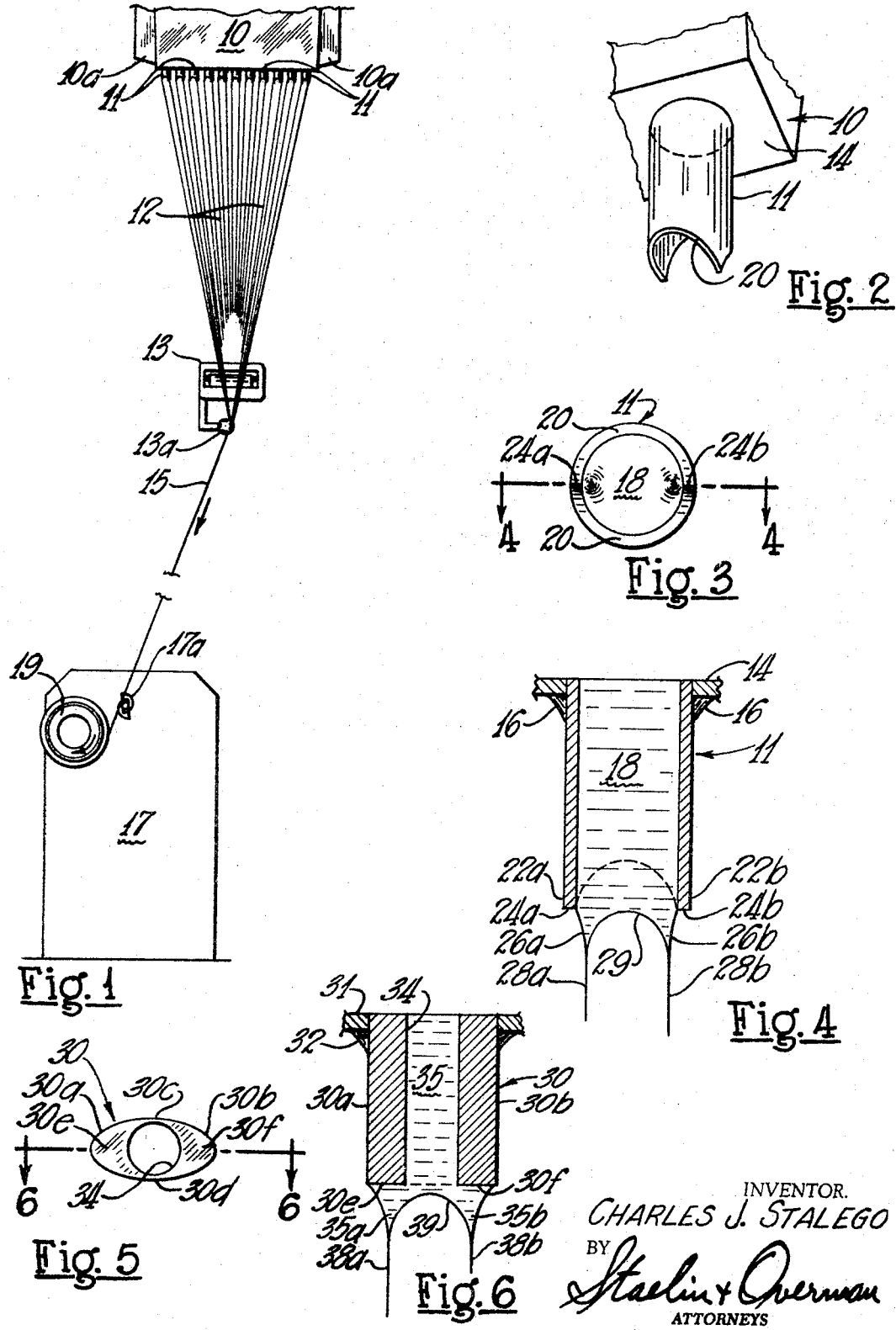

METHOD AND APPARATUS FOR PROCESSING HEAT-SOFTENED MATERIAL

Filed June 16, 1966  3 Sheets-Sheet 3

INVENTOR
CHARLES J. STALEGO
BY
Staelin & Overman
ATTORNEYS 3,475,147
METHOD AND APPARATUS FOR PROCESSING HEAT-SOFTENED MATERIAL
Charles J. Stalego, Newark, Ohio, assignor to Owens-Corning Fiberglas Corporation, a corporation of Delaware
Filed June 16, 1966, Ser. No. 558,078
Int. Cl. C03b 37/02
U.S. Cl. 65—1                                    20 Claims

ABSTRACT OF THE DISCLOSURE

Method of and apparatus for dividing a source of heat-softened mineral material into a plurality of smaller streams by forming a plurality of spaced flow guiding regions on a distribution surface, flowing the material from a supply source onto an upper area of the distribution surface, and discharging a plurality of streams of the material from discharge areas formed on the lowest areas of the flow guiding regions of the surface.

---

This invention relates to method and apparatus for flowing streams of heat-softened material, such as glass, from a feeder or supply to provide multiple streams of the material for attenuation into fibers of filaments in an area where only a single stream has been attenuated heretofore.

It has been commercial practice in the field of attenuating glass or other heat-softened mineral or other material into fibers or filaments from streams of glass or other material, to flow the streams through orifices or outlets formed in depending tips or projections provided on the floor or bottom wall of a feeder or bushing receptacle. Heretofore the exit region of the orificed projections or tips have been defined by concentric circular edges at the bottom of the orificed tips lying in a horizontal plane or a plane parallel with the floor or bottom of the feeder or bushing. A relatively large individual stream has been flowed through each tip to form an individual fiber forming cone from which the single fiber or filament has been attenuated.

Upon emission to the atmosphere, a stream of glass or other material necks down, as determined by the viscosity and surface tension, to form a cone-like body of glass from the tip of which is drawn a fiber. Tests indicate that the cohesive forces which transmit the attenuation forces from the fiber to the body of the cone are closely related to the viscosity of the glass. Surface tension of the glass also contributes to the transfer of the forces over the periphery of the cone, but, in addition, acts to bring about constriction of the streams into the conical configuration. Low viscosity fluids, such as glass at too high a temperature may actually be constricted into beads by the surface tension, or in other words, divided into a series of droplets instead of flowing as a continuous stream. High viscosity of the fluid, on the other hand, slows the constricting forces and does so with much more pronounced effects as the diameter is diminished, thereby causing viscosity to act as a major factor determining stability in the fiber-forming zone.

Taking these facts into consideration, it can be seen that if the viscosity of a given glass emitted from an orifice to a forming cone is too high, the tension required to be applied to the cool fibers to effect attenuation of the cone can be so high as to result in breakage of the fiber. At the more fluid end of the viscosity range, however, the glass flows more freely and the balance surface tension becomes somewhat indefinite which causes a form of pumping action or dancing movement of the cone at the feeder tips. A further lowering of the viscosity of the glass results in an approach toward constriction by the surface tension to the extent that discontinuous separate droplets of the fluid are formed.

A range of viscosity, therefore, exists within which fiberization of the glass can be accomplished but above and below which fibers are difficult or impossible to produce.

Apparatus has been introduced to the art in which water-cooled shield or fin members are disclosed for disposition immediately adjacent to fiber-forming cones in non-contacting relation with the feeder to absorb heat from the cones by way of radiation absorption and to divide the total number of tips and and the respective cones into smaller groups. The fin members shield the environment of the tips in the fiber-forming cones emitted therefrom against extraneous turbulences of the atmosphere outside the zone of fiber formation. The presence of such cooled shield members have made it possible to extend the viscosity range to permit fiberization of glass heated to a higher temperature than could otherwise be fiberized with fluid emitted in an unshielded fiber-forming zone. Further, this has enabled the attenuation of fibers of smaller diameter. The fact that the melt can thereby be raised to a high temperature also permits production of fibers of greater uniformity and permits fiberization of glasses which previously were not fiberizable while at the same time making operation conditions less critical to temperature variations due to turbulences in the surrounding atmosphere. By the provision of the shield members in the zone of fiber formation, the rate of cooling of the glass emitted from the feeder is not left to the variant conditions of the atmosphere, but provides a greater control of the rate of cooling and makes the conditions of fiber formation more certain and stable.

A method and apparatus has been discovered for attenuating a plurality of fibers or filaments from a plurality of relatively smaller fiber-forming cones established in the same area as previously utilized by a single fiber-forming cone. The temperature differentials and viscosity of the relatively smaller fiber-forming cones can be controlled more closely by the method and apparatus herein resulting in a stability of the relatively smaller fiber-forming cones that has been established heretofore only by the use of the fin shields discussed above. Further, more smaller diameter fibers can be drawn from the same area. The invention allows bushing bottoms to be more rapidly forged, cast, or milled than the present method of welding tips in after or before die forming. In the case of glass fibers, more fluid glasses can be formed by controlling the separator points. The invention will greatly simplify the bushing or feeder bottom construction.

Accordingly, it is an object of this invention to provide an improved method and apparatus for processing heat-softened flowable material.

Another object of this invention is to provide an improved feeder and bushing arrangement from which a plurality of fibers can be drawn from the same area where a single fiber was drawn before.

A still further object of this invention is to provide an improved method and apparatus for processing heat-softened flowable material in which the stability of the fiber-forming cones can be more closely controlled.

Still another object of this invention is to provide an improved process for forming fibers or filaments which allows the pulling of fibers or filaments from a bushing or feeder which exceeds that dimension to which it was limited in the past because of the tendency of the fibers or filaments to break out when the fan of fibers being pulled toward a gathering point exceeded an angle of 7° from the vertical.

The invention features apparatus for processing heat flowable material including a distribution member and means for delivering a supply of the flowable material to the distribution member. The distribution member has a plurality of spaced flow guiding regions, each terminating in a discharge edge, for forming a like plurality of streams of the flowable material. Each flow guiding region is formed on the distribution member to effect a greater total heat transfer between a stream of the flowable material and the flow guiding region that can be effected by areas of the distribution member intermediate the flow guiding regions. In one embodiment of the invention the flow guiding region of the distribution member may be thicker than adjacent areas of the distribution member and thereby effect a greater total heat transfer. In an alternative embodiment of the invention, the wall thickness of the distribution member may be substantially uniform and each flow guiding region terminates in a discharge edge which is further from the delivery means than the other edges of the distribution member.

The delivery means may include a receptacle adapted to contain a supply of the flowable material, the receptacle having orifice means formed therein for feeding the material from the receptacle to the distribution member. Means are provided for heating the receptacle to maintain the flowable material at a desired temperature. In addition, means are provided for attenuating a fiber from each of the streams. In the preferred embodiments of the invention, the heat-softened material is glass and each stream of glass forms a fiber-forming cone at the discharge edge of the flow guiding region. The orifice means may comprise a single orifice formed in the receptacle adapted to feed flowable material to each of the flow guiding regions of the distribution member. Alternatively, the orifice means may also comprise a plurality of orifices, usually smaller than the single orifice approach, formed in the receptacle. Each of the plurality of orifices is positioned to feed flowable material to a corresponding flow guiding region on the distribution member.

The receptacle normally has a bottom wall and upwardly extending side walls with the orifice means being formed in the bottom wall thereof. The distribution member may comprise a member defining a closed distribution surface, which member extends below the bottom wall of the receptacle.

Several approaches in construction may be followed to utilize the teachings of this invention to enable the formation of a plurality of fiber forming streams and cones in substantially the same area as utilized heretofore for an individual fiber-forming stream and cone. The distribution member may have a cross-sectional configuration varying from substantially circular near the top of the member to an elongated oval at the lower end of the distribution member. The elongated oval cross section has a major axis that is longer than the diameter of the circular cross section. The elongated oval cross section may be formed into acute angles at the extremities of the major axis. The bottom edge of the above distribution member may define a plane substantially parallel with the plane defined by the bottom wall of the receptacle. More broadly, these types of distribution members may be defined as those that have a cross-sectional configuration that varies from defining a first area near the top of the member to defining a larger area at the lower end of the member, if all other requisite conditions are met.

In another approach, the distribution member may have a bottom edge which includes the plurality of discharge edges. Each of the discharge edges depends from the distribution member below the remainder of the bottom edge. The distribution member may comprise a tubular member extending below the bottom wall of the receptacle. The orifice means may be positioned to feed the material to a distribution surface interior of the tubular member. The orifice means may comprise a single orifice formed in the receptacle or a plurality of orifices formed in the receptacle wherein each orifice is positioned to feed material to a corresponding flow guiding region. In this embodiment, the orifice means may also be positioned to feed the material to a distribution surface exterior of the tubular member. In this instance the orifice means advantageously comprises a plurality of orifices formed in the receptacle, each orifice being positioned to feed material to a corresponding exterior flow guiding region.

Apparatus embodying the teachings of this invention may also feature a distribution member which comprises a wall-like member extending below the delivery means and having an open distribution surface. The wall-like member may have thicker flow guiding regions separated by intermediate thinner areas. Alternatively or in addition to the thicker flow guiding regions, a distribution surface of the distribution member may have a bottom edge including the plurality of discharge edges wherein the discharge edges depend further below the distribution surface than the remainder of the bottom edge of the wall-like member.

The invention further features apparatus for processing flowable material which includes a distribution surface having a plurality of discharge edges for forming a like plurality of streams of the flowable material, means for delivering a supply of flowable material to the distribution surface. The discharge edges are further from the supply delivery means than any of the other edges of the distribution surface. The supply delivery means preferably comprises a receptacle to contain a supply of the material and orifice means formed in the receptacle for feeding the material to the distribution surface. Means are provided for attenuating a fiber from each of the streams. In order to overcome the probability of the fibers or filaments breaking whenever the fan of a plurality of fibers or filaments being attenuated exceeds an angle of 7° from the vertical, the distribution surface may be canted toward the attenuating means in an area adjacent each discharge edge. This feature of the invention is applicable whether a plurality or only an individual fiber forming cone is being formed adjacent the discharge edges defined herein.

This invention also features the method of carrying out the teachings herein, the novel apparatus being particularly suited for such method.

Other objects, features and advantages of this invention will become apparent when the following description is taken in conjunction with the accompanying drawings, in which:

FIGURE 1 is a somewhat schematic elevational view of glass fiber strand-forming apparatus embodying the teachings of this invention;

FIGURE 2 is a greatly enlarged fragmentary isometric view of a bottom portion of a stream feeder showing an arrangement of a tubular projection or tip embodying the teachings of this invention;

FIGURE 3 is a bottom plan view of the orifice construction shown in FIGURE 2;

FIGURE 4 is a sectional view taken substantially on the lines 4—4 of FIGURE 3;

FIGURE 5 is a bottom plan view of a second embodiment of orifice construction of this invention;

FIGURE 6 is a sectional view taken substantially on the lines 6—6 of FIGURE 5;

FIGURE 7 is a bottom plan view of another orifice construction of this invention;

FIGURE 8 is a sectional view taken substantially on lines 8—8 of FIGURE 7;

FIGURE 9 is a bottom plan view of another orifice construction of this invention;

FIGURE 10 is a sectional view taken substantially on the lines 10—10 of FIGURE 9;

FIGURE 11 is a bottom plan view of another orifice construction of this invention;

FIGURE 12 is a sectional view taken substantially on the lines 12—12 of FIGURE 11;

FIGURE 13 is a bottom plan view of another orifice construction of this invention;

FIGURE 14 is a sectional view taken substantially on the lines 14—14 of FIGURE 13;

FIGURE 15 is a bottom plan view of another orifice construction of this invention;

FIGURE 16 is a sectional view taken substantially on the lines 16—16 of FIGURE 15;

FIGURE 17 is a bottom plan view of another orifice construction of this invention;

FIGURE 18 is a sectional view taken substantially on the lines 18—18 of FIGURE 17;

Figure 19:
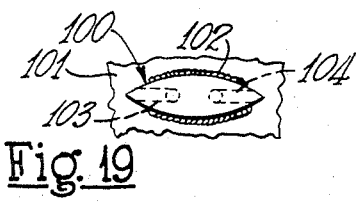
FIGURE 19 is a bottom plan view of another orifice construction of this invention.

While the method and apparatus of the invention are particularly useable for flowing groups of streams of heat-softened materials such as glass, it is to be understood that the invention may be utilized for flowing streams of other heat-softenable materials and particularly mineral materials such as fusible rock, slag, or the like.

Referring to the drawings in greater detail, FIGURE 1 illustrates a fiber forming operation in which glass fibers 12 are attenuated from orificed tips 11 of a feeder receptacle 10 containing and supplying heat-softened flowable material such as glass. Electrical heat is supplied to the feeder or receptacle 10 by connecting sources of power to terminals 10a on the ends of the feeder 10. After attenuation, the fibers 12 are usually drawn over an applicator 13 for receipt of a coat of sizing material prior to the fibers being drawn together over a gathering wheel 13a at which the fibers are formed into a strand 15. The strand 15 is wound by a winder 17 into a package on a rotating collet 19 and is traversed into the package by a suitable traverse such as a spiral-wire type traversing device 17a.

Referring to FIGURES 2 through 4, there is illustrated a portion of a receptacle providing stream feeding means, a bushing or feeder 10 which may be formed of metals or metallic alloys, such as platinum rhodium, capable of withstanding the intense heat of the molten mineral materials such as molten glass. The receptacle, feeder or bushing 10 may be secured to a forehearth (not shown) containing a supply of heat-softened glass which flows from the forehearth into the feeder or bushing. The feeder or bushing may be heated by electrical energy in a conventional manner to maintain the molten glass in the feeder at a desired viscosity.

The feeder may be provided with a number of distribution members, which in FIGURES 2 through 4 are illustrated as circular tubular projections or orificed tips 11. Each orificed tip or means for flowing a stream of glass from the feeder 11 is of comparatively short, tubular shape, each tip being secured to the floor 14 of the feeder 10 by welding as indicated at 16 in FIGURE 4, or by other suitable means. Each tubular tip or projection 11 of the embodiment in FIGURES 2 through 4 is comparatively thin walled and has an orifice formed therein of circular shape in cross section through which flows the molten glass 18.

The orificed tips illustrated in FIGURES 2 through 4 are shown on a greatly enlarged scale. The exit region of each of the orificed projections is particularly configurated to modify or increase the viscosity of a portion of the glass of the stream and to divide the major stream 18 into a plurality of streams to form a like plurality of fiber-forming cones 26a and 26b. The discharge or outlet end of the distribution member 11 is in this instance defined by a curved edge 20 providing two lip portions 22a and 22b which terminate in apices 24a and 24b. The edge 20 may be continuously flat throughout its curved length.

Referring to FIGURES 5 and 6, there is illustrated a second embodiment of a distribution member or orificed tip 30. Each tip is again secured to the floor 31 of a feeder by welding indicated at 32 in FIGURE 6, or by other suitable means. In this instance, the discharge or outlet end of the tip 30 defines a plane substantially parallel with the floor 31 of the feeder. The orifice tip 30 has two thicker walls 30a and 30b spaced from each other by intermediate thinner walls 30c and 30d. The tip 30 has formed therein an opening 34 through which flows molten glass 35.

The exit region of the orifice tip 30 is configurated to modify or increase the viscosity of the glass of the stream 35 as it is delivered from the feeder by the utilization of the two thicker walls 30a and 30b to provide two flow guiding regions which tend to divide the stream 35 into two streams culminating in fiber-forming cones 35a and 35b.

The operation of the different structures in FIGURES 2 through 4 and FIGURES 5 and 6 in dividing the streams 18 and 35 into two or more separate streams is not clearly understood. One theory has been proposed that due to the additional surface area provided by the depending portions or lips 22a and 22b, each in contact with one side region of the adjacent body of glass, more heat is conducted away from the glass in the region of the lips 22a and 22b than in the other surface area of the tubular projection 11 in contact with the glass. The lips 22a and 22b, therefore, provide cold spots or regions of slightly reduced temperature. Due to the temperature differential in the material adjacent the depending lips 22a and 22b, the glass or molten material is drawn to the region of reduced temperature and tends to flow from the apices 24a and 24b of the depending lips 22a and 22b in the form of comparatively short cones of glass 26a and 26b. The viscosity is of nonuniform character as the the glass of the cone forms the streams 28a and 28b with the axis of the cones 26a and 26b and streams or fibers 28a and 28b offset from the axis of the tubular projection 11. Thus the glass, as it flows from the tip regions 22a and 22b of the distribution member 11, tends to pull toward or is drawn toward the depending lips 22a and 22b. In this theory it is reasoned that filaments will pull off of the coldest side of a distribution member or tip. If more than one cold spot is developed, then the glass will pull from all of the cold spots in the flow of glass is ample.

The first operation is equally applicable in the distribution member or orifice tip shown in FIGURES 5 and 6. The thicker walls 30a and 30b along with the planar ends 30e and 30f of the thick walls operate to provide cold spots or regions of slightly reduced temperature. As the glass stream 35 flows from the opening 34 formed in the tip 30, the planar ends of the tip including sections 30e and 30f wet out with the glass 35 to provide spaced cold spots or regions of slightly reduced temperature as required. Due to the temperature differential in the material adjacent the planar ends 30e and 30f, the glass or molten material is drawn to the region of reduced temperature and tends to flow from the planar regions 30e and 30f in the form of comparatively short cones of glass 35a and 35b. The viscosity is of non-uniform character as the glass of the cone forms the streams 38a and 38b with the axis of the cones 35a and 35b and streams 38a and 38b separated and offset from the axis of the opening or orifice 34 formed in the tip 30.

A second theory of operation has been proposed in that the heat transfer between the glass and the adjacent areas of the tips 11 or 30 is operative to allow the glass streams 18 and 35 to wet out the tips 22a and 22b and the planar areas 30e and 30f. Direct contact of the intermediate surface regions 29 and 39, respectively, of the bodies of glass 18 and 35 with the air chills or reduces the temperature of the glass at the regions 29 and 39 at a faster rate than the regions of the glass in contact with the tips 22a, 22b and planar discharge areas 30e and 30f. Hence, thermal differentials are set up in different regions of the body of the glass establishing varying viscosity therein whereby the glass may be drawn or attenuated from each of the discharge regions into a linear body filament or fiber. In the second theory it is presumed that the body of glass is of a viscous constituency so that it is supported and suspended by adhesion to the walls of the distribution members 11 and 30. The exposed regions 29 and 39 of the bodies of glass are cooled and their temperature reduced by contact with the ambient air at a faster rate than those regions of the bodies of glass in contact with the walls or discharge regions of the tips 11 and 30. This condition presumably provides substantial resistance to the direct flow of the glass into a single cone from the orifice formed in the distribution members 11 and 30 and is sufficient to prevent the natural or inherent tendency for glass to gravitate to a single cone of substantially circular cross section. The second theory provides that the glass in contact with the walls and discharge regions is at a higher temperature and hence lower viscosities and provides separate flows which join with the more viscous regions in a plurality of fiber-forming cones such as 26a, 26b and 35a, 35b.

Since instrumentation of sufficient sophistication is not available to determine which of the theories or combination of theories provides the results found, an empirical approach has been formulated, which when followed in practice in the construction of the apparatus shown herein provides the results desired. That is, in producing apparatus for processing heat-softened flowable material in accordance with the inventive concepts herein there is utilized a distribution member and means for delivering a supply of flowable material to the distribution member, such as 11 or 30. The distribution member has a plurality of spaced flow guiding regions, each terminating in a discharge edge, for forming a like plurality of streams of the flowable material. Each flow guiding region is formed on the distribution member to effect a greater total heat transfer between a stream of the flowable material and the flow guiding region than can be effected by areas of the distribution member intermediate the flow guiding regions. When following the empirical approach of a greater total heat transfer, the results are obtained as desired whether the heat transfer is from the glass to the distribution member or vice versa.

In the embodiment illustrated in FIGURES 2 through 4, the wall thickness of the distribution member is substantially uniform and greater heat transfer is effected by providing longer flow guiding regions which terminate in discharge edges which are further from the delivery means than the other edges of the distribution member. That is, a longer travel path is provided since the lips 22a and 22b depend further below the feeder 14 than any other portion of the distribution member 11. In the embodiment shown in FIGURES 5 and 6 a greater total heat transfer is effected by providing thicker walls 30a and 30b and a wider discharge edge or region 30e and 30f. The thinner walls 30c and 30d and their planar terminations are unable to effect as great a heat transfer as set forth for the discharge regions of the glass.

Referring to FIGURES 7 and 8 there is shown another embodiment of the teachings of this invention for providing a plurality of fiber-forming cones in substantially the same area as previously occupied by a single fiber-forming cone. A distribution member 40 comprises a member defining a closed distribution surface, i.e., the interior opening surface of the distribution member 40, which distribution member extends below the bottom wall 41 of a receptacle for containing a supply of glass. A distribution member may be welded as at 42 or otherwise attached to the bottom wall 41. The distribution member 40 has a cross-sectional configuration which varies from substantially circular near the top of the member to an elongated oval at the lower end of the member. The elongated oval cross section at the bottom of the distribution member has a major axis that is longer than the diameter of the substantially circular cross section at the top of a member. In the apparatus of FIGURES 7 and 8 the elongated oval cross section at the bottom of the member is crimped or formed into acuate angles at the extremities of the major axis. Following the empirical rule for construction set forth hereinbefore, it will be seen that the flow guiding regions of the distribution member 40 between the substantially circular upper cross section and the elongated oval cross section at the bottom member define a travel route that is longer between the ends or extremities of the major axis of the elongated oval and the circular cross section above. Thus a greater total heat transfer is effected and two fiber-forming cones are formed for the attenuation of fibers at areas adjacent the extremities of the major axis of the elongated oval.

Referring to FIGURES 9 and 10, there is shown an illustration of another distribution member 50 which varies in cross-sectional configuration from substantially circular near the top of the member to an elongated oval at the lower end of the member. In this instance the elongated oval cross section is not crimped or formed into an acute angle at the extremities of the major axis. However, longer travel paths and thus greater heat transfer areas are still provided, as discussed above, so that two fiber-forming cones appear adjacent the extremities of the major axis of the elongated oval cross section at the bottom of the member. It will be noted in both of the embodiments shown in FIGURES 7, 8 and FIGURES 9, 10 that a bottom edge of the distribution member defines a plane substantially parallel with a plane defined by the bottom wall of the receptacle. Thus in these embodiments and later embodiments, as well as in the embodiments shown in FIGURES 5 and 6, it is not necessary to have discharge edges or regions that depend below the remainder of the bottom edge of the distribution member. Distribution members of this type may be generically defined as members having a cross-sectional configuration that varies from defining a first area near the top of said distribution member to defining a larger area at the lower end of the distribution member. This provides the longer travel paths and thus the possibilities for effecting a greater total heat transfer that is necessary.

Referring to FIGURES 11 and 12, there is shown an alternative embodiment of the invention in which a distribution member 60 is shown which varies in cross-sectional configuration from substantially circular near the top of the member to triangular at the lower end of the member. The area defined by the triangular cross section is larger than the area defined by the circular cross section so that longer travel paths are afforded between the upper part of the distribution member 60 and the apices 63, 64 and 65 of the triangular cross section, thereby affording longer travel paths and an effecting of a greater total heat transfer. Again in this embodiment the plane denfied by the bottom edge of the distribution member 60 may be substantially parallel to the bottom wall 61 of the feeder to which the distribution member is attached. In any of the embodiments shown in FIGURES 5 through 12, the discharge areas or edges of the distribution members may be made to depend below the remainder of the bottom edge of the distribution member, which dependency may be desirable in certain applications.

Referring to FIGURES 13 and 14, there is illustrated another embodiment of a distribution member 70 which varies in cross-sectional configuration from substantially circular near the top of the member to substantially square at the lower end of the member. Again, in this instance, the area defined by the square cross section is larger than the area defined by the circular cross section. However, the discharge regions or areas at the corners of the square cross section depend in apices 73, 74, 75 and 76 which are lower than the remainder of the bottom edges of the distribution member 70. The distribution member 70 is attached by welding as at 77 or by other suitable means to the feeder 71.

Heretofore, the orifice means for supplying flowable material to the distribution member has been illustrated as a single orifice formed in the bottom of the feeder. However, as illustrated in FIGURES 15 and 16 the single orifice may be replaced by a plurality of orifices, each of the plurality preferably being disposed to feed a corresponding flow guiding region of the distribution member. The distribution member 80 varies in cross-sectional configuration from substantially circular near the top of the member to substantially square at the bottom of the member. The distribution member 80 is welded as at 87 or otherwise suitably attached to the feeder 81. The bottom edge of the distribution member 80 is formed to terminate in apices 83, 84, 85 and 86 at the four corners of the substantially square cross section. The discharge regions, edges or areas 83 through 86 depend below the remainder of the bottom edge of the distribution member 80.

In order to clarify the transposition from a single to a plurality of orifices assume that a single large orifice 82 has been filled in and a plurality of small orifices 83a, 84a, 85a, and 86a have been formed as shown in FIGURE 15. The plurality of comparatively smaller orifices are located to feed streams of glass to flow guiding regions terminating in the corresponding discharge edges or apices 83, 84, 85 and 86, respectively. The formation of the plurality of smaller orifices may be effected by drilling or other means more accurately and rapidly than a single larger orifice into which a distribution member must be fitted and welded. Although the plurality of smaller orifices are preferably located as closely as possible to their corresponding flow guiding regions and discharge edges, the requirements for accuracy in this aspect of construction are less than where the distribution member must be fitted into a larger single orifice.

While both the single large orifice and the plurality of smaller orifice means have been shown hereinbefore as located centrally of the distribution member to feed a distribution surface which is interior of the distribution members, it is to be noted that the orifice means, whether single or a plurality, may be formed to feed material to the exterior surface of a distribution member. In many instances this will be more desirable, again because of the accuracy of the drilling required.

Referring to FIGURES 17 and 18, there is illustrated a distribution member 90 which is square in cross section throughout its length. The distribution member 90 may be tubular or hollow as shown in FIGURES 17 and 18, or may be solid to accomplish the same result. Since the cross sectional configuration of the distribution member 90 does not vary to define a larger area at the bottom of the distribution member, apices or discharge edges 93, 94, 95 and 96 are formed at the corners of the distribution member 90 which are lower than the remainder of or depend below the bottom edge of the distribution member 90. Thus longer travel paths and greater heat transfer routes are defined for the flow of the molten material, thereby insuring the formation of four separate fiber-forming cones. The orifice means in this instance comprises comparatively smaller orifices 93a, 94a, 95a and 96a formed in the bottom wall 91 of a feeder to which the distribution member 90 may be attached as by welding at 97. Each of the plurality of orifice means feeds flowable material to its corresponding flow guiding region which terminates in a discharge edge as hereinbefore described. Again it will be noted, that the milling, boring, and forming requirements, while exacting, do not present the same problem as the instances where a single orifice is formed in the bottom of the feeder and a distribution member is fitted therein and retained in its fitted position by welding, etc.

Each of the distribution members herein has a distribution surface on which flow guiding regions are defined, which flow guiding regions are separated by intermediate areas where a smaller heat transfer is effected. The distribution surface may be interior of a tubular type member, whether the tubular member is round, oval, square, triangular or of other geometrical configuration. As has been noted hereinbefore, however, the distribution surface need not be the interior surface of a tubular type member. It may be the exterior surface of a solid or hollow member. Further, the distribution surface need not form a closed surface as is the case with the tubular or solid configurations. That is, the distribution surface may be a wall-type surface in which the empirical formula is followed to provide flow guiding regions separated by intermediate areas.

Figure 20:
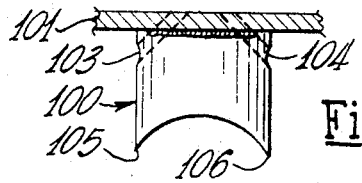
FIGURE 20 is a side elevational view of the orifice construction illustrated in FIGURE 19.

Referring to FIGURES 19 and 20, there is illustrated a solid distribution member 100 which may be attached to the bottom wall of a feeder 101 as by welding as indicated at 102 or the like. After attachment of the distribution member 100 to the bottom wall 101 of the feeder, two orifice means or holes 103 and 104 are bored through the bottom wall of the feeder and the distribution member 100 to provide a supply of the flowable material to the flow guiding regions on each end of the distribution member. The regions terminate in apices 105 and 106 which depend a distance below the remainder of the bottom of the distribution member 100 a distance sufficient to provide the discharge areas required. In this instance, all of the distribution members may be positioned on the bottom wall of the feeder and the orifice means formed either vertically downwardly or on the slant as shown to supply flowable material to the flow guiding regions.

Figure 21:
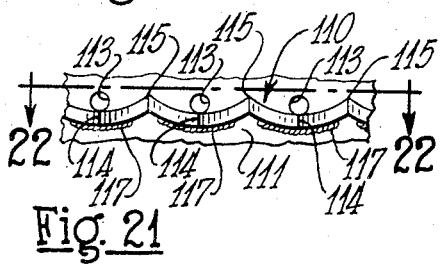
FIGURE 21 is a bottom plan view of another orifice construction of this invention.
Figure 22:
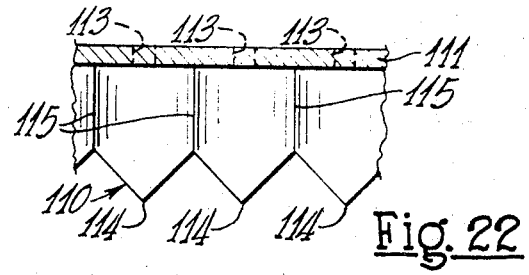
FIGURE 22 is a front elevational view of the orifice construction of FIGURE 21.

Referring to FIGURES 21 and 22, there is illustrated a distribution member 110 which is of a wall-type structure having spaced scalloped or ridged shapes to assist in separating the flow of glass from a plurality of orifice means 113. A plurality of depending discharge apices or edges 114 are formed on the distribution member 110 corressponding to respective orifice means 113 and are effective to provide discharge areas for glasn streams which may be attenuated in the fibers. Although the wall-type distribution member 110 has been shown as having ridges 115 separating the flow guiding regions, it is to be noted that the proper construction of the discharge apices or edges 114 in the proper relationship with corresponding orifice means 113 will make the separating ridges 115 unnecessary. Again the wall-type distribution member 110 may be connected to the bottom of the feeder 111 by welding as indicated at 117 or other suitable means.

Figure 23:
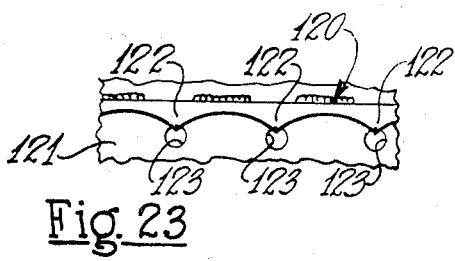
FIGURE 23 is a bottom plan view of another orifice construction of this invention.
Figure 24:
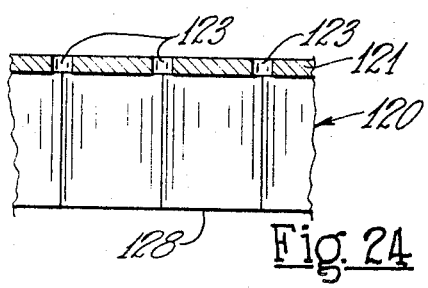
FIGURE 24 is a rear elevational view of the orifice construction of FIGURE 23.

Referring to FIGURES 23 and 24, there is illustrated a distribution member 120 which is also of the wall-type but in which the flow guiding regions have been formed by providing thicker wall areas 122 separated by thinner walls. A plurality of orifice means 123 are located to provide a flow of glass to the thicker wall areas 122. Although the thicker wall edges are shown as terminating in ridges below the orifice means 123, since this is desirable in certain circumstances, it is not necessary that the sharp ridge configuration be utilized. It is possible to form the thicker wall areas in a number of ways to effect a greater total heat transfer and thus provide a flow guiding region. It will be noted that the bottom edge 128 of the distribution member 120 is planar and substantially horizontal to the bottom wall 121 of the feeder. Since there are thicker wall areas separated by thinner wall areas, streams of glass will form fiber-forming cones below the thicker wall areas.

Although not shown specifically, it is to be noted that the orifice means 113 and 123 in the FIGURES 21, 22 and FIGURES 23, 24, respectively, may be extended so that their edges get closer and closer together to finally define a continuous slit or slot in the bottom of the feeders. The distribution members 110 and 120 will still be operative as described hereinbefore to separate the flow of glass into a plurality of comparatively smaller fiber-forming cones. Under normal circumstances, the use of a slot or a slit as an orifice means would be undesirable since it would weaken the structural integrity of the bottom wall of the feeder.

In accordance with standard practice, orifices have been directed vertically downwardly and the filaments drawn from the orifices must be drawn in a generally vertical direction a substantial distance from the bushing before the filaments are gathered into strands so that the filaments will not be directed from the orifices at a relatively sharp angle. If the filaments are angularly directed from the orifices, they will engage the side walls which define the orifices and rupturing of the filaments at the orifices is likely to occur. Accordingly, the furnace or crucible with its bushing has been disposed a relatively great distance from the gathering point to minimize the angular relation between the filaments and their respective orifices so as to reduce filament breakage at the orifice. For example, the furnace may be located on the floor or story above the location of the winding drum, thereby requiring the services of an attendant at two elevations.

In addition to the inconvenience resulting from the relative arrangement of the furnace and winding spool, the aforedescribed vertical arrangement has other disadvantages. For example, if a filament breaks at the orifice during operation, a bead of glass will generally form at the orifice. This bead of glass may thereafter fall from a plate or bushing into the filaments being collected in the formation of a strand, causing breakage of the filament and/or causing nonconformity in the formation of the strand.

Therefore, the fan of filaments being collected from a single bushing or feeder has in the past been limited so that the length of the bushing or feeder does not provide a fan of filaments that exceeds 7° from the vertical. The apparatus shown herein may be utilized to overcome the disadvantages above to provide apparatus which may be conveniently attended by a single operator and which may be utilized in installations where there is far less head room available than is necessary for conventional apparatus. Further, the filaments may be drawn or attenuated from the furnace laterally as well as downwardly so as to avoid falling beads or droplets of glass. In addition, bushings of greater lengths may be utilized to provide greater production from a single forming station.

Figure 25:
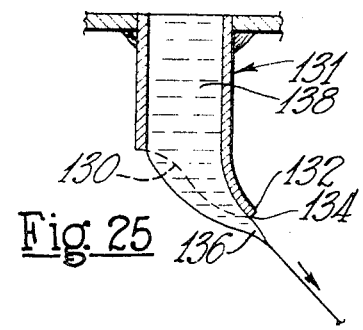
FIGURE 25 is a cross-sectional view of an orifice construction embodying the teachings of this invention in which fibers may be pulled at an angle greater than 7° from the vertical.

Referring to FIGURE 25, there is illustrated an orificed tip 131 which is similar to that shown in FIGURES 2 through 4. The exit region of the orifice projection is again particularly configured to modify or increase the viscosity of a portion of the glass of the stream 138 to form a fiber-forming cone 136. The discharge or outlet end of the distribution member 131 is in this instance defined by a curved edge 130 providing a lip portion 132 which terminates in an apex 134. The distribution surface adjacent the discharge edge or region is canted toward the attenuating or gathering means. This allows the cone 136 to be formed having an axis pointing toward the attenuating or gathering means so that the stream of glass is not pulled laterally over a vertical edge and will have fewer discontinuities.

Figure 26:
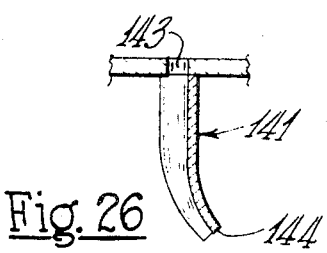
FIGURE 26 is a cross-sectional view of an alternative orifice construction for pulling fibers at an angle greater than 7°.

Referring to FIGURE 26, there is shown an alternative embodiment of this arrangement in which a wall-type distribution member 141 has a distribution surface fed by an orifice means 143 and in which the distribution surface adjacent the discharge edge 144 is canted towards an attenuation or gathering means, providing the same effect as discussed hereinbefore for FIGURE 25. The wall-type distribution member may be of the type shown either in FIGURE 21 or in FIGURE 23 and still be effective.

The canting of the distribution surface toward the attenuating or gathering means will reduce drastically the construction costs of the feeder assembly since each distribution surface may be canted to a different angle with ease. This avoids the requirement for a plurality of orifices to be bored in the feeder means at a particular angle and the alignment of an orifice tip or projection with each orifice means at the same angle to enable the formation of a fan of filaments or fibers at an angle of greater than 7° from the vertical. All orifices may be drilled normal to the bottom wall of the feeder. It should be noted that the canting of the distribution surface of the apparatus illustrated herein is equally effective with one or a plurality of discharge edges of a particular distribution surface. The ability to form smaller fiber-forming cones with the apparatus and method of this invention enhances the effectiveness of canting the distribution surface.

From the foregoing it will be apparent that through the establishing of a plurality of differential viscosities in molten glass adjacent a like plurality of regions of discharge or delivery from distribution members described hereinbefore, improved stability and control of the streams will be provided whereby streams having more uniform characteristics are flowed from a feeder and, therefore, fibers or filaments attenuated from the streams are of more uniform size. Smaller and finer fibers may be formed which are becoming increasingly important in the textile and other applications. It will be possible in some applications to eliminate fin shields between the orificed tips or distribution members.

The method of this invention then includes the steps of flowing heat-softened material from a supply onto a distribution surface and discharging a plurality of streams of the material from discharge edges of the surface by effecting a greater total heat transfer between the material and spaced flow guiding regions of the surface than between the material and areas of the surface intermediate the flow guiding regions. The method may also include the step of attenuating fibers from the relatively smaller and more stable fiber-forming cones formed by the plurality of streams adjacent the discharge edges of the distribution surface.

It is apparent that within the scope of the invention, modifications and different arrangements may be made other than as herein disclosed, and the present disclosure is illustrative merely, the invention comprehending all variations thereof.

I claim:

1. Apparatus for producing fibers from heat-softened flowable material including, in combination; a receptacle for containing a supply of said heat-softened material; a distribution member extending from said receptacle; orifice means formed in said receptacle for delivering a supply of heated flowable material on said distribution member; said distribution member having a plurality of spaced flow guiding regions for forming a like plurality of separate streams from the supply of flowable material on said distribution member; each flow guiding region extending from said orifice means to an associated discharge edge formed on said distribution member, each flow guiding region comprising means for establishing a temperature differential between said region and areas adjacent said region which effects a greater total heat transfer between said flowable material and said flow guiding region than is effected by areas of said distribution member intermediate said discharge edges; and means for attenuating a plurality of fibers from said plurality of streams.

2. Apparatus as defined in claim 1 in which each flow guiding region of said distribution member is thicker than said adjacent areas of said distribution member and thereby effects a greater total heat transfer.

3. Apparatus as defined in claim 1 in which the wall thickness of said distribution member is substantially uniform and in which each flow guiding region terminates in a discharge edge, said discharge edges being further from said orifice means than the other edges of said distribution member.

4. Apparatus as defined in claim 1 in which said receptacle has a bottom wall and upwardly extending side walls, said orifice means being formed in the bottom wall thereof, and in which said distribution member comprises a member defining a closed distribution surface extending below said bottom wall of said receptacle.

5. Apparatus as defined in claim 4 in which said member has a cross sectional configuration varying from substantially circular near the top of said member to an elongated oval at the lower end of said member, said elongated oval cross section having a major axis that is longer than the diameter of said circular cross section.

6. Apparatus as defined in claim 5 in which said elongated oval cross section is formed into acute angles at the extremities of said major axis.

7. Apparatus as defined in claim 5 in which a bottom edge of said member defines a plane substantially parallel with a plane defined by the bottom wall of said receptacle.

8. Apparatus as defined in claim 4 in which said member has a cross-sectional configuration that varies from defining a first smaller cross-sectional area near the top of said member to defining a larger cross-sectional area at the lower end of said member.

9. Apparatus as defined in claim 4 in which said distribution member has a bottom edge which includes said plurality of discharge edges, each of said discharge edges depending from said distribution member below the remainder of said bottom edge intermediate said discharge edges.

10. Apparatus as defined in claim 4 in which said distribution member comprises a tubular member.

11. Apparatus as defined in claim 10 in which said orifice means is positioned to feed said material to a distribution surface formed on the exterior of said tubular member.

12. Apparatus as defined in claim 1 in which said distribution member comprises a solid member extending below said orifice means having a closed exterior distribution surface, a bottom edge of said distribution surface defining said plurality of discharge edges which depend further below said distribution surface than the remainder of said bottom edge.

13. Apparatus as defined in claim 1 in which said distribution member comprises a wall-like member extending below said orifice means and having an open distribution surface.

14. Apparatus as defined in claim 13 in which said wall-like member has thicker flow guiding regions separated by intermediate thinner areas along said member.

15. Apparatus as defined in claim 13 in which said distribution surface of the distribution member has a bottom edge including said plurality of discharge edges, said discharge edges depending further below said distribution surface than the remainder of said bottom edge intermediate said discharge edges.

16. Apparatus for providing fiber-forming cones from flowable heat-softened glass including, in combination, a receptacle for containing a supply of flowable glass and a member having a distribution surface extending from said receptacle, orifice means formed in said receptacle for delivering a supply of flowable glass to said distribution member, said distribution surface terminating in a bottom edge having a plurality of discharge edges formed thereon for forming a like plurality of said cones, said discharge edges being further from said orifice means than the remainder of said bottom edge of said distribution surface.

17. Apparatus as defined in claim 16 in which said distribution surface is canted adjacent each discharge edge to permit fibers to be pulled from cones at an angle with respect to the vertical.

18. Apparatus for producing glass fibers, including, in combination, a receptacle having a bottom wall and adapted to contain a supply of molten glass, a distribution surface extending downwardly from said bottom wall and having a discharge edge for forming a fiber-forming cone of the molten glass, said receptacle having an orifice formed in the bottom wall thereof to feed molten glass to said distribution surface, the axis of said orifice being substantially normal to the bottom wall of said receptacle, means for attenuating a fiber from said cone, said distribution surface being canter toward said attenuating means adjacent said discharge edge to permit a fiber to be pulled from said cone at an angle with respect to the bottom wall of said receptacle, said discharge edge being further from said orifice in said receptacle than any other edge of said distribution surface.

19. The method of dividing a source of heat-softened mineral material into a plurality of smaller streams comprising the steps of forming a plurality of spaced flow guiding regions on a distribution surface to establish a temperature differential between each of said regions and areas of said surface adjacent said regions which effects a greater total heat transfer between said flowable material and said flow guiding region than is effected by said adjacent areas, flowing the material from a supply source onto an upper area of said distribution surface and discharging a plurality of streams of the material from discharge edges formed on the lowest areas of said flow guiding regions of said surface.

20. The method as defined in claim 19 which further includes the step of attenuating fibers from fiber-forming cones formed by said smaller streams adjacent discharge edges of said distribution surface.

References Cited

UNITED STATES PATENTS

| | | |
|---|---|---|
| 2,212,448 | 8/1940 | Modigliani. |
| 2,489,508 | 11/1949 | Stalego _____ 65—1 |
| 2,566,252 | 8/1951 | Tooley et al. _____ 65—1 X |
| 2,711,054 | 6/1955 | Urbanetti. |
| 2,783,590 | 4/1957 | Stalego. |
| 3,309,184 | 4/1967 | Stalego _____ 65—1 |

S. LEON BASHORE, Primary Examiner

R. L. LINDSAY, JR., Assistant Examiner

U.S. Cl. X.R.

18—8; 65—2, 11